United States Patent
Mansour et al.

(10) Patent No.: US 9,915,730 B2
(45) Date of Patent: Mar. 13, 2018

(54) METHOD AND SYSTEM FOR THROUGH-THE-WALL RADAR IMAGING

(71) Applicant: Mitsubishi Electric Research Laboratories, Inc., Cambridge, MA (US)

(72) Inventors: Hassan Mansour, Boston, MA (US); Ulugbek S. Kamilov, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 420 days.

(21) Appl. No.: 14/807,063

(22) Filed: Jul. 23, 2015

(65) Prior Publication Data

US 2017/0023673 A1    Jan. 26, 2017

(51) Int. Cl.
G01S 13/02 (2006.01)
G01S 13/89 (2006.01)
G01S 13/88 (2006.01)

(52) U.S. Cl.
CPC ............ *G01S 13/89* (2013.01); *G01S 13/888* (2013.01); *G01S 2013/0245* (2013.01)

(58) Field of Classification Search
CPC . G01S 13/888; G01S 13/89; G01S 2013/0245
USPC .......................................................... 342/22
See application file for complete search history.

(56) References Cited

U.S. PATENT DOCUMENTS

| | | | |
|---|---|---|---|
| 7,898,468 B2 | 3/2011 | Samaniego et al. | |
| 8,212,710 B2 | 7/2012 | Samaniego | |
| 8,570,208 B2 | 10/2013 | Sarkis | |
| 2011/0014869 A1 | 1/2011 | Nakajima | |
| 2015/0077282 A1* | 3/2015 | Mohamadi ............. | G01S 7/415 342/27 |

OTHER PUBLICATIONS

M. G. Amin and F. Ahmad, "Through-the-wall radar imaging: Theory and applications," Radar Signal Processing Section, E-Reference Signal Processing, Elsevier, 2013.
(Continued)

*Primary Examiner* — Timothy A Brainard
(74) *Attorney, Agent, or Firm* — Gene Vinokur; James McAleenan; Hironori Tsukamoto (57) ABSTRACT

A method and system for generating an image of a scene behind a wall, wherein the scene is represented as a grid, by first transmitting a radar pulse through the wall using a transmitter and receiving a set of echoes corresponding to the radar pulse being reflected by the scene in a receiver at a known location. Based on the location, an imaging operator that relates the set of echoes to the grid is determined. Using the imaging operator, a sparse delay kernel that matches a response of a current image to a similar response in the set of echoes is determined. Then, the current image is updated, based on the set of echoes, the imaging operator, and the sparse delay kernel. The transmitting, the receiving, the determining, the obtaining, and the updating steps are repeated for different locations until a termination condition is reached.

18 Claims, 6 Drawing Sheets

(56) References Cited

OTHER PUBLICATIONS

T. S. Ralston, G. L. Charvat, and J. E. Peabody, "Real-time through-wall imaging using an ultrawideband multiple-input multiple-output (MIMO) phased array radar system," in IEEE International Symposium on Phased Array Systems and Technology (ARRAY), 2010, pp. 551-558.

S. Kaczmarz, "Angenäherte Auflösung von Systemen linearer Gleichungen.," Bull. Int. Acad. Polon. Sci. A, vol. 1937, pp. 355-357, 1937.

T. Strohmer and R. Vershynin, "A randomized Kaczmarz algorithm with exponential convergence," Journal of Fourier Analysis and Applications, vol. 15, pp. 262-278, 2009.

H. Mansour and O. Yilmaz, "A sparse randomized Kaczmarz algorithm," in IEEE Global Conference on Signal and Information Processing (Global-SIP), Dec. 2013, pp. 621-621.

P. Setlur, M. Amin, and F. Ahmad, "Multipath model and exploitation in through-the-wall and urban radar sensing," IEEE Transactions on Geoscience and Remote Sensing, vol. 49, No. 10, pp. 4021-4034, 2011.

P. Setlur, G. Alli, and L. Nuzzo, "Multipath exploitation in through-wall radar imaging via point spread functions," IEEE Transactions on Image Processing, vol. 22, 2013.

P. C. Chang, Physics-Based Inverse Processing and Multi-path Exploitation for Through-Wall Radar Imaging, Ph.D. thesis, Ohio State University, 2011.

M. Leigsnering, F. Ahmad, M. Amin, and A. Zoubir, "Multipath exploitation in through-the-wall radar imaging using sparse reconstruction," IEEE Trans. Aerosp. Electron. Syst., vol. 50, No. 2, pp. 920-939, Apr. 2014.

H. Mansour and D. Liu, "Blind multi-path elimination by sparse inversion in through-the-wall-imaging," in Proc. IEEE 5th Int. Workshop on Computational Advances in Multi-Sensor Adaptive Process. (CAMSAP), St. Martin, Dec. 15-18, 2013, pp. 256-259.

M. Leigsnering, F. Ahmad, M. G Amin, and A. M. Zoubir, "CS based specular multipath exploitation in TWRI under wall position uncertainties," in Proc. 8th IEEE Sensor Array and Multichannel Signal Processing Workshop, Coruña, Spain, Jun. 22-25, 2014, pp. 481-484.

\* cited by examiner

METHOD AND SYSTEM FOR THROUGH-THE-WALL RADAR IMAGING

FIELD OF THE INVENTION

This invention relates generally to radar imaging, and more particularly to through-the-wall radar (TWI) imaging.

BACKGROUND OF THE INVENTION

Through-the-wall-imaging (TWI) can detect objects in a scene behind a wall. In a typical application, a transmitting antenna array emits a radar pulse that propagates through the wall. The pulse is reflected by the objects and propagate back to a receiving antenna array as a set of echoes. The composition of the scene can then be visualized by generating a radar image that represents scene, including the number, locations and shape of the objects and reflectivities of the objects. However, depending on dielectric permittivity and permeability of the walls, the received signal is often corrupted with indirect secondary reflections due to the walls, which result in artifacts, such as ghosts, that clutter the radar image. Therefore, it is desired to reduction artifacts and significantly improve the quality and applicability of TWI.

Signal Model

A TWI radar imaging system typically includes arrays of one or more transmitting antennas and receiving antennas, ($N_s$), $N_r$. A time-domain waveform of the pulse transmitted by each source is s(t), and a primary impulse response, excluding multi-path reflections, of the scene is $g_p(t, n_r, n_s)$ at the receiving antenna $n_r \in \{1, \ldots N_r\}$ as a reflection of a pulse from transmittng antenna $n_s \in \{1, \ldots N_s\}$. The impulse response of the multi-path reflections due to the wall clutter is $g_m(t, n_r, n_s)$.

Using a conventional time-domain representation, the received signal can be represented by $$r(t, n_r, n_s) = s(t) * (g_p(t, n_r, n_s) + g_m(t, n_r, n_s)), \quad (1)$$

where * is a convolution operator.

Without loss of generality, if there are K objects in the scene, each inducing a primary impulse response $g_k(t, n_r, n_s)$ indexed by $k \in \{1 \ldots K\}$. The impulse response can be modeled by a convolution of a delay kernel $d(t, n_r, n_s)$ with the primary impulse response $g_k(t, n_r, n_s)$ of each object, such that $$g_p(t, n_r, n_s) = \Sigma_{k=1}^{K} g_k(t, n_r, n_s), \text{ and}$$

$$g_m(t, n_r, n_s) = d(t, n_r, n_s) * (\Sigma_{k=1}^{K} g_k(t, n_r, n_s)).$$

For a particular transmitter-receiver antenna pair $(n_r, n_s)$, all primary reflections experience the same delay convolution kernel $d(t, n_r, n_s)$ when generating the clutter. The delay kernel can be regarded as a weighted Dirac delta function $$d(t) = \Sigma_j w(t_j) \delta(t - t_j),$$

where $t_j > 0$ is the time delay at which the reflections reach the receiving antenna from the $j^{th}$ multi-path source, and $w(t_j)$ is an attenuation weight of the $j^{th}$ path.

The definition of the sparse delay kernel $d(t, n_r, n_s)$ can be extended to that of an activation function that generates both the primary and multiple impulse responses by allowing $t_j \geq 0$. Consequently, the received signal can be expressed as a superposition of the primary responses of all K objects convolved with an activation function as $$r(t, n_r, n_s) = s(t) * \Sigma_{k=1}^{K} d(t, n_r, n_s) * g_k(t, n_r, n_s), \quad (3)$$

where $d(t, n_r, n_s)$ is independent of k.

Kaczmarz Method

The Kaczmarz method can be used to determine a solution x of large overdetermined systems of linear equations $Ax = r$, where $A \in \mathbb{C}^{M \times N}$ has full column rank and $r \in \mathbb{C}^M$. The procedure sequentially cycles through the rows of A, orthogonally projecting the solution estimate at iteration j onto the solution space given by a row or block of rows $A_j$, such that $$x_j = x_{j-1} + A_j^H \frac{r_j - \langle A_j, x_{j-1} \rangle}{\|A_j\|_2^2}. \quad (4)$$

Randomizing the row selection criteria improves the convergence performance of the Kaczmarz method. A sparse randomized Kaczmarz (SRK) projects the iterate $x_{j-1}$ onto a subset of rows of A weighted by a diagonal matrix $W_j$, i.e.

$$x_j = x_{j-1} + W_j A_j^H \frac{r_j - \langle A_j W_j, x_{j-1} \rangle}{\|A_j W_j\|_2^2}. \quad (5)$$

The weighting is based on identifying, in each iteration j, a support estimate $T_j$ for x corresponding to the largest $\hat{k}$ entries of the iterate $x_j$, where $\hat{k}$ is some predetermined sparsity level. The weighting gradually scales down the entries of $A_j$ that lie outside of $T_j$ by a weight $\omega_j = 1/\sqrt{j}$. As the number of iterations becomes large, the weight $$\frac{1}{\sqrt{j}} \to 0$$

and the method begins to resemble the randomized Kaczmarz method applied to the reduced system $A_T x_T = r$, where $A_T$ is a subset of the columns of A at which the sequence of sets $T_j$ converges. The SRK method is capable of determining sparse solutions to both over and under-determined linear systems, and enjoys faster convergence compared to the randomized Kaczmarz method.

Reducing clutter produced by the wall is described for a number of prior methods. Some methods assume a perfect knowledge of the reflective geometry of the scene. For example, Setlur et al. al. developed multi-path signal models to associate multi-path ghosts to the true locations of the targets, thereby improving the radar system performance by reducing false positives in an original synthetic aperature radar (SAR) image, see Setlur et al., "Multipath model and exploitation in through-the-wall and urban radar sensing," IEEE Transactions on Geoscience and Remote Sensing, vol. 49, no. 10, pp. 4021-4034, 2011.

One method describes a physics based approach to multipath exploitation where the imaging kernel of the back-projection method is designed to focus on specific propagation paths of interest, see Chang, "Physics-Based Inverse Processing and Multi-path Exploitation for Through-Wall Radar Imaging," Ph.D. thesis, Ohio State University, 2011.

Another method combines target sparsity with multi-path modeling to achieve further improvements in the quality of TWI, see Leigsnering et al., "Multipath exploitation in through-the-wall radar imaging using sparse reconstruction," IEEE Trans. Aerosp. Electron. Syst., vol. 50, no. 2, pp. 920-939, April 2014. Specifically, their approach incorporates sources of multi-path reflections of interest into a sparsifying dictionary and solves a group sparse recovery problem to locate the targets from randomly subsampled, frequency stepped SAR data.

TWI can be formulated as a blind sparse-recovery problem, where scene parameters are unknown. Mansour et al. describe multipath-elimination by a sparse inversion (MESI) algorithm that removes the clutter by iteratively recovering the primary impulse responses of targets followed by estimation of corresponding convolution operators that result in multi-path reflections in the received data, see Mansour et al., "Blind multi-path elimination by sparse inversion in through-the-wall-imaging," Proc. IEEE 5th Int. Workshop on Computational Advances in Multi-Sensor Adaptive Process. (CAMSAP), St. Martin, Dec. 15-18, 2013, pp. 256-259.

SUMMARY OF THE INVENTION

The embodiments of the invention provide a method and system for through-the-wall radar imaging (TWI). Radar pulses are transmitted by one or more transmitting antennas from a location, travel through a wall, reflect off objects in a scene behind the wall, and return to one or more receiving antennas as a set of echoes.

The method uses a randomized Kaczmarz method that jointly estimates a sparse scene and removes clutter induced by internal wall reflections. The method is memory efficient, especially in the case where the antennas are located randomly.

In one embodiment of the invention, the method is implemented on a handheld or mobile device integrated with one or more antennas and a display screen. To generate an image, the radar pulse is transmitted by one or more of the antennas from a location. Then, the antennas are switched to receiving mode to acquire a set of echoes reflected by the objects. The device continues to send pulses from different locations while updating the current image according to the received echoes until a termination condition is reached. The changes in the locations improve the quality of the final image.

In another embodiment of the invention, a stand alone transmitting antenna is used, and the device includes one or more of the receiving antennas and the display screen. In this case, the transmitting antenna sends radar pulses that propagate through the wall and are reflected by the objects. The device acquires echoes at different locations.

DETAILED DESCRIPTION OF THE PREFERRED EMBODIMENTS

System Setup

Figure 1A:
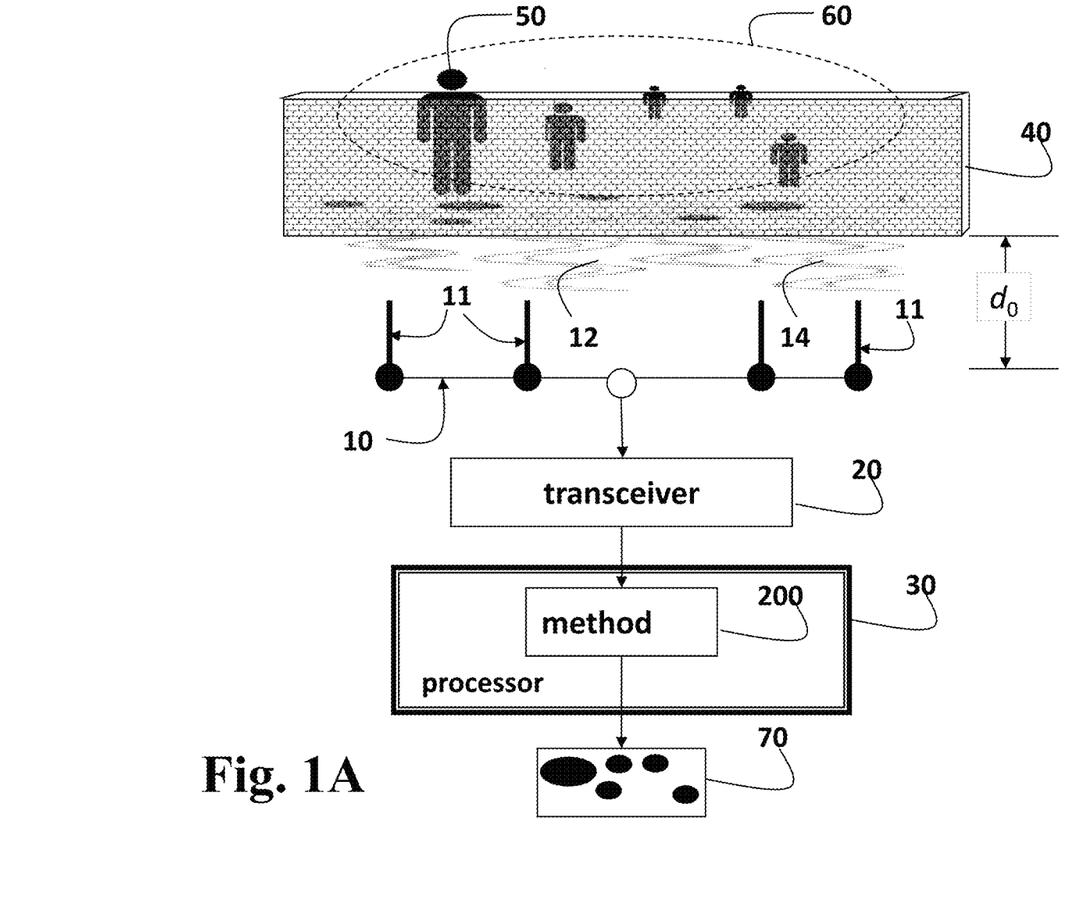
FIGS. 1A and 1B are schematics of a system and method for reconstructing a scene behind a wall according to embodiments of the invention.
Figure 1B:
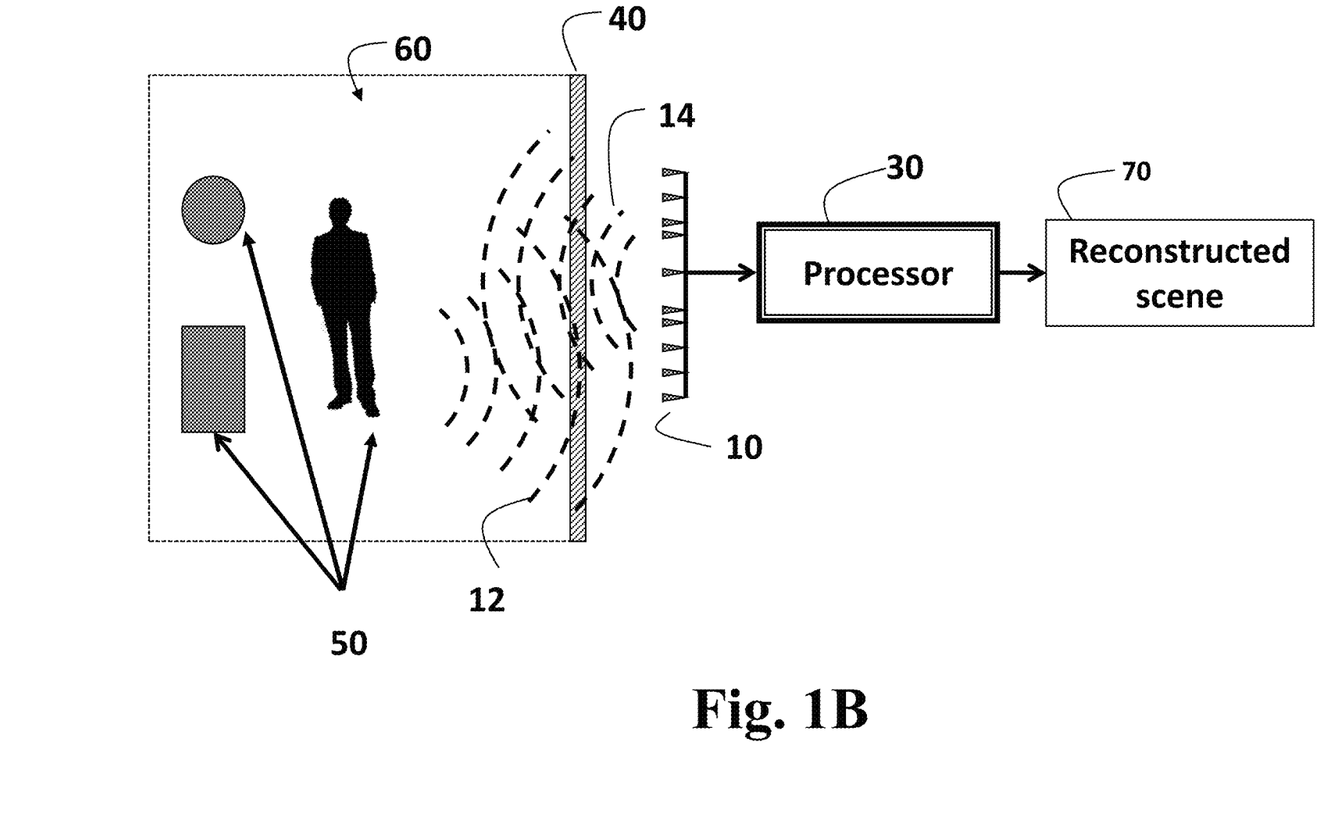
Figure 1C:
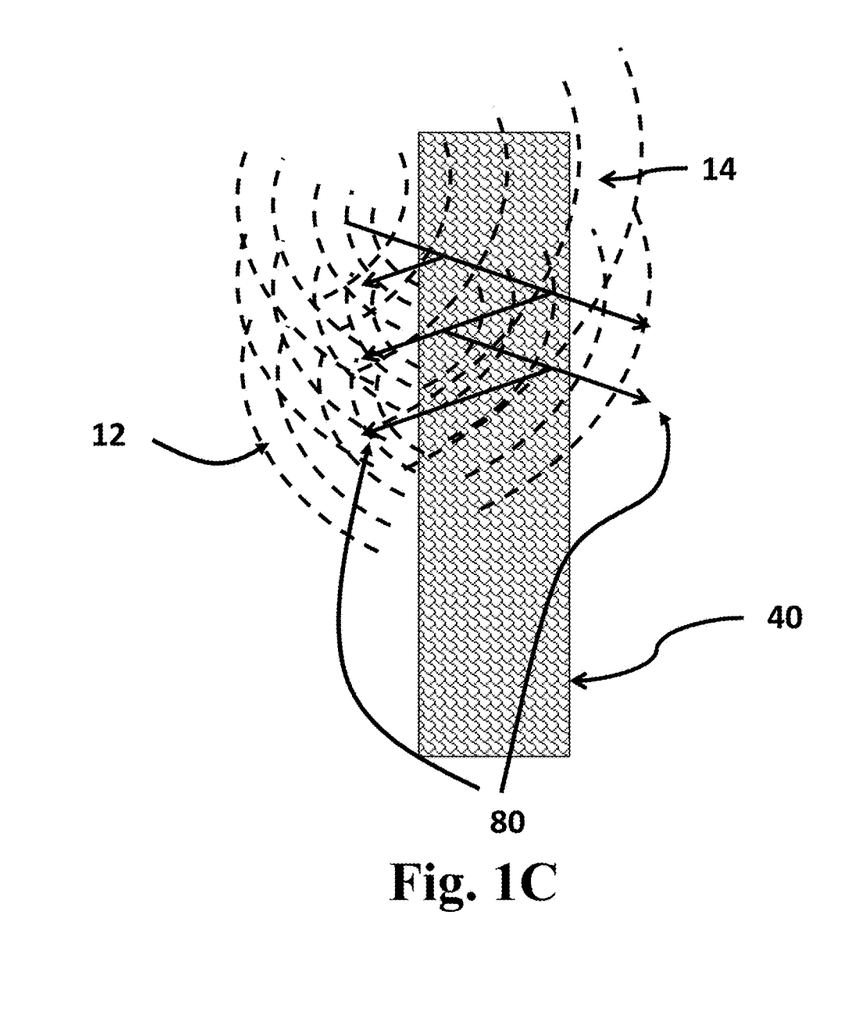
FIG. 1C is a schematic of indirect secondary reflections due to the wall considered by embodiments of the invention.

As shown in FIGS. 1A and 1B embodiments of our invention provide a system method and system for through-the-wall imaging (TWI) of objects 50 that do not require any prior knowledge of scene geometry. The method can reconstruct a scene 60 behind a wall 40.

The system includes an antenna array 10, transceiver 20, and processor 30. The transceiver can tranmit and receive radar pulses. The antenna comprises a set of one or more antenna elements 11. The antenna elements can either transmit or receive as controlled by the processor. The transceiver transmits one or more pulses 14 using one or more of the set of antenna elements 11 of the antenna array at a location in front of the wall. The transmitted pulse propagates through the wall 40 and are reflected by the possible objects 50 in a scene 60 behind the wall 40.

Reflected signals, (impulse responses or set of echoes) 12 corresponding to each pulse, are received by one or more antenna elements of the array 10 as described below. The received signals include primary reflections received via direct paths, and indirect secondary reflections received via multi-paths. It is noted, that in some embodiments, an antenna element can be used to only transmit, or only receive pulses, or to transmit and receive pulses.

The received signals 12 are processed by a method 200 to produce an image 70 that reconstructs the scene 60 including the objects 50. The method can be performed in the processor 30 connected with buses to a memory and input/output interfaces as known in the art.

As shown in FIG. 1 C, of particular concern are indirect secondary reflections 80 due to the wall, which can confuse the reconstruction.

Figure 1D:
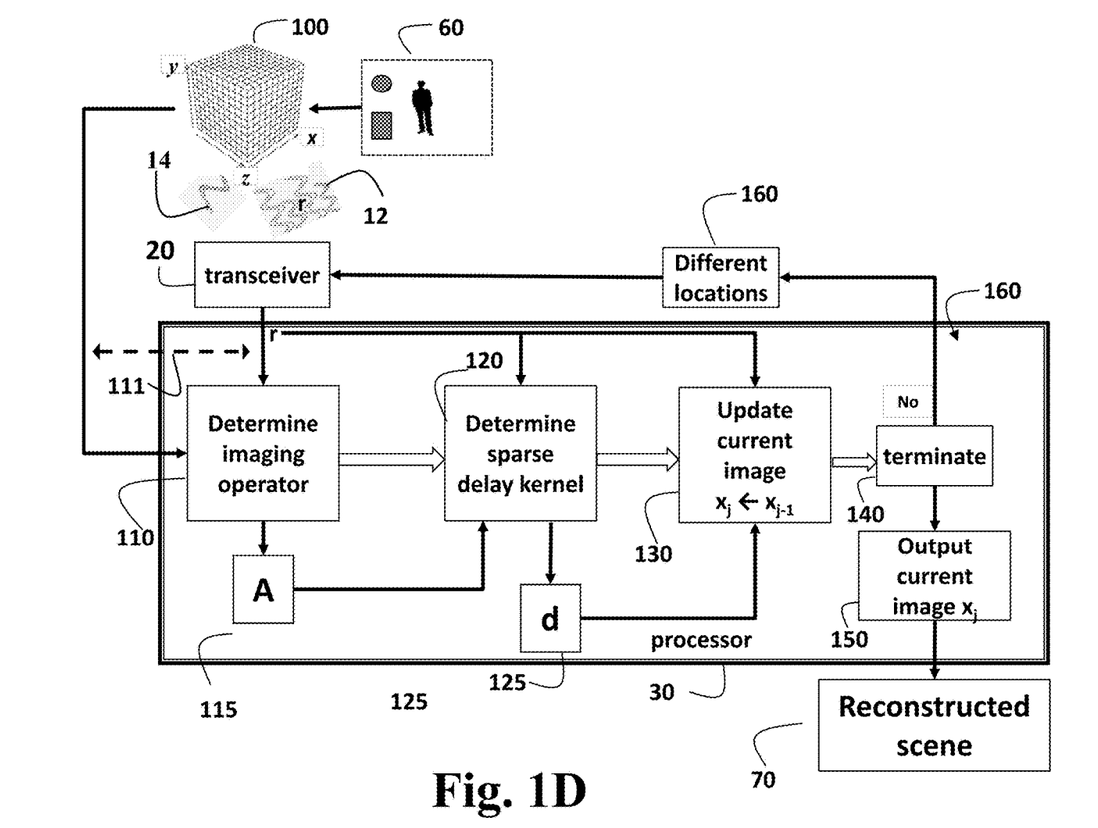
FIG. 1D is a flow diagram of a system and method for through-the-wall radar imaging according to the embodiments of the invention.

FIG. 1D shows the overall method and system for through-the-wall radar imaging. For processing purposes, the scene 60 is represented as a two-dimensional (2D) or three dimensional (3D) grid 100. The grid can be a 3D volume of voxels, or a 2D array of pixels.

A radar pulse is transmitted through the 40 wall using the transmitting antenna positioned at a known location in front of the wall. A set of echoes, corresponding to the radar pulse, reflected by targets in the scene are received by a set of one or more of the receiving antennas at the location.

An imaging operator A 115 is determined 110 as described in greater detail below. The operator relates the set of echoes to the points in the grid using the location. Using the imaging operator, a sparse delay kernel d 125 that matches a response of a current image to a similar response in the set of echoes is determined.

Based on the set of echoes and the sparse delay kernel, the current image is updated 130. The transmitting, the receiving, the determining, the obtaining,and the updating steps are repeated for different known locations 160, in front of the wall until a termination condition 140 reached, in which case the current image is ouputted 150 as the reconstructed scene 70. The termination condition can be a maximal number of iterations, or the end of an imaging session, i.e., no more data are available. Alternatively or additionally, the termination condition is reached when a difference between the current image before and after the updating is less than a predetermined threshold.

The different locations can be determine using a conventional locator device, such an inertial guidance system, a global positioning system (GPS), accelerometers, and the like, which are typically found in many modern mobile hand-held computing devices.

The steps can be performd in the processor 30 connected to memory and input/output interfaces as known in the art.

The method and system as described above enables a user to identify the number, locations and shapes of objects behind the wall using one or more devices that can transmit and receive radar signals. The method produces a two dimensional (2D) or three dimensional (3D) image of a scene behind an obstruction, where the locations and shapes of the objects are identified in the image. For a transmitted radar pulse, the method uses a reflection of the pulse, i.e., echoes, from objects behind the wall to construct an image of the objects. Additional transmitted and echoes pulses at the different locations are used to improve the image of the objects. A spacing between the different locations can be non-uniform.

The system can be embedded in a handheld or mobile device with one or more antennas and a display screen. To generate an image on the screen of the scene behind the obstruction, wall, the device is initiated by sending a pulse from one or more of the antennas. The antennas are then switched to receiving mode to measure reflected pulses (a set of echoes) from objects behind the wall. The device continues to send and receive pulses at different locations. The different locations improves the quality of the image of the objects behind the wall.

The system can also have a standalone transmitting antenna with a handheld or mobile device with one or more receiving antennas and a display screen. In this case, the transmitting antenna sends a series of radar pulses that propagate through the wall and reflect off objects behind the wall and are measured by the antennas on the mobile device. The device is moved to measure reflections at different locations. With every new measurement, the device uses the imaging method to improve the image of the shapes and locations of objects behind the wall.

Figure 3:
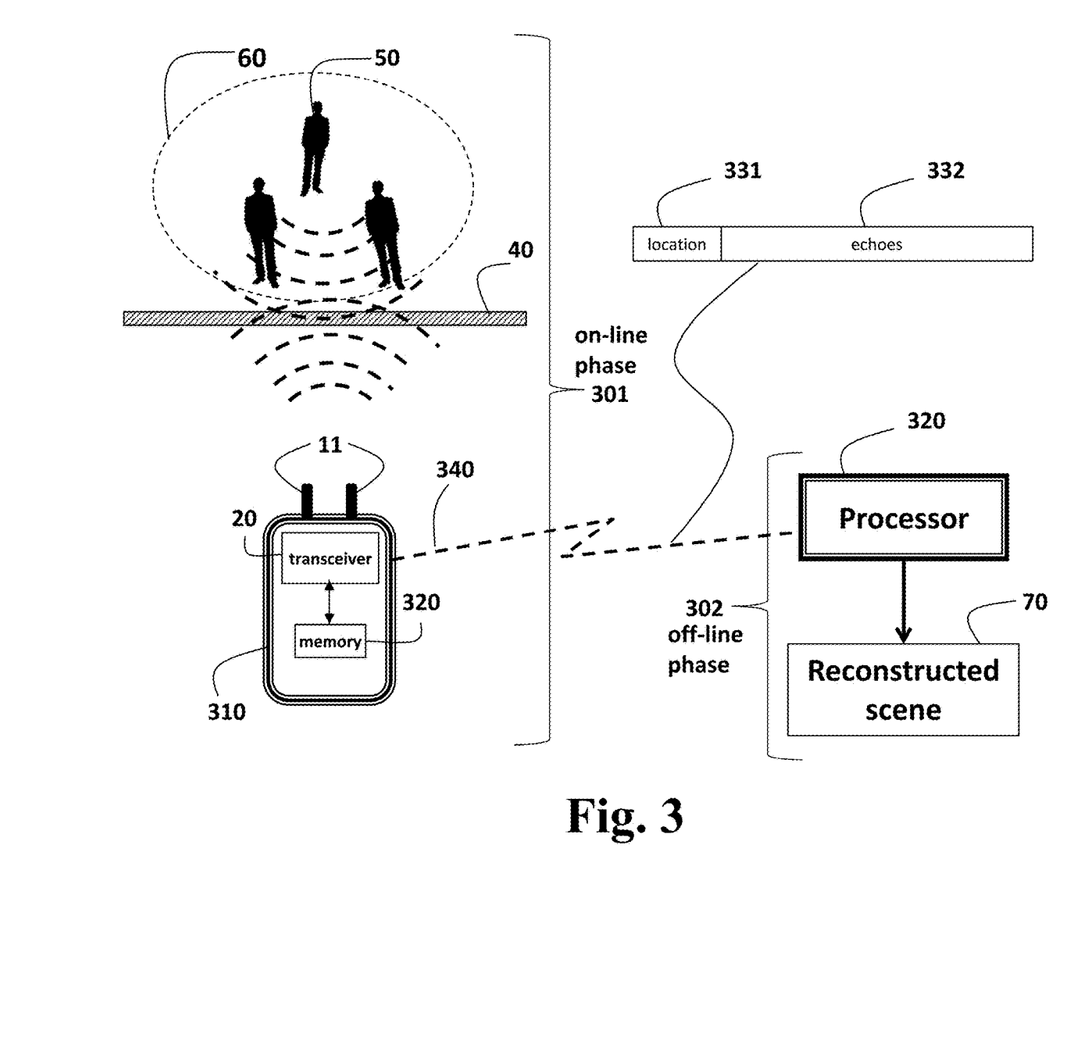
FIG. 3 is a schematic of an embodiment that uses on-line and off-line phases.

In an alternative embodiment as shown in FIG. 3, the method has an on-line phase 301 and an off-line phase 302. During the on-line phase a device 310 "scans" the scene 60 behind the wall 40 from the different non-uniform locations in front of the wall. In this embodiment, the device includes the transceiver 20 coupled to the antenna 11 and a memory 320. However, the device does not have sufficient processing power to process the echoes. In other words, the device is a low-complexity device that does not process the received echoes itself Instead, the device only transmits and receives, and the locations and echoes are stored in a memory 320.

Periodically, or on demand, the data, i.e.,the location 331 and echoes 332 stored in the memory are transmitted or otherwise transferred 340 to a processor 320 to produce the reconstructed scene 70 during the off-line phase. The periods can be regular or irregular. In this case, the processor 320 is not co-located with the transceiver. In addition, the data can be transferred in batches when the amount of memory available during the off-line phase is limited. Preferably, the batches are transferred in a random order with respect to the different non-uniform locations 331.

Clutter Removal as a Nonlinear Inverse Problem

In "blind" TWI, the wall parameters and the number of object behind the wall are unknown or unavailable. The objective is to identify the number, locations and shapes of the objects, and to remove ghosts using only received signals $r(t, n_r, n_s)$, and the source waveform, i.e., the transmitted pulse $s(t)$.

The signals received at transmitter and receiver at different locations $(n_r, n_s)$ can be expressed as $r_{n_r,n_s} \in \mathbb{R}^{N_t}$, where $N_t$ is the number of echoes acquired by the receiver for each transmited pulse. The measurements are real-valued. Therefore, the frequency content can be reduced to $$N_f = \left\lfloor \frac{N_t}{2} \right\rfloor + 1$$

frequency coefficients beause the remaining coefficients are their complex conjugates. A vectorized time-domain activation function is $d_{n_r,n_s} \in \mathbb{R}^{N_t}$.

Let $S: \mathbb{R}^{N_t} \to \mathbb{C}^{N_f}$ be the source waveform matched-filtering operator that maps $r_{n_r,n_s}$ to its frequency domain matched-filtered response $\hat{r}_{n_r,n_s} = S r_{n_r,n_s}$. We discretize the scene into the $N_x \times N_y \times N_z$ grid 100 and construct an operator $G_{n_r,n_s}: \mathbb{C}^{N_f} \to \mathbb{C}^{N_x N_y N_z}$ that maps $\hat{r}_{n_r,n_s}$ to the image x, such that $$G_{n_r,n_s}(\omega, k) = e^{i\omega(\|\phi(k) - \phi(n_r)\|_2 + \|\phi(k) - \phi(n_s)\|_2)/c}, \quad (6)$$

where $\omega$ is the frequency in radians, k is a spacial index in $N_x \times N_y \times N_z$, c is the speed of the wave in free space, and $\phi(\cdot) \in \mathbb{R}^3$ is the spatial coordinate vector of scene index k, receiver $n_r$, and transmitter $n_s$. The received signal model in equation (3) can now be expressed as a function of the image x as $r_{n_r,n_s} = d_{n_r,n_s} * S^H G_{n_r,n_s}^H x$.

The combined imaging and clutter removal problem can now be formulated as a nonlinear inverse problem $$\min_{d,x} \|r_{n_r,n_s} - d_{n_r,n_s} * S^H G_{n_r,n_s}^H x\|. \quad (7)$$

Clearly, the problem in equation (7) is non-convex and ill-posed in general. However, we are interested in a structured solution that obeys the following conditions:

C1. The primary reflections of the targets have a stronger response than their corresponding multi-path reflections;

C2. The number of primary objects in small relative to the cardinality of the voxel volume promoting a sprase solution vector; and C3. The delay kernel d is sparse, and the convolution is causal non-circular.

Sparse Kaczmarz with Clutter Deconvolution

In the context of radar imaging, we define a $N_f \times N_x N_y N_z$ matrix $A_{n_r,n_s} = S^H G_{n_r,n_s}$, and denote by $r \in \mathbb{R}^{N_f N_r N_s}$ the stacked measurements $r_{n_r,n_s}$, and by $A \in \mathbb{C}^{N_f N_r N_s \times N_x N_y N_z}$ the stacked matrices $A_{n_r,n_s}$. The SRK update iteration in equation (5) can then be used to incrementally generate the image x by setting $r_j = r_{n_r,n_s}$ and $A_j = A_{n_r,n_s}$ using different transmitter-receiver pairs $(n_r, n_s)$ in every iteration j.

In order to enable the estimation of the sparse delay kernel concurrently with the radar image, we extend to a SRK framework that alternates between determining the sparse delay kernel d 125 given an estimate of the current image x, followed by updating x to fit the new measurements.

To that end, we construct a linear operator $\mathcal{H}: \mathbb{R}^{N_f \times N_t} \to \mathbb{R}^{N_t}$ that determines the non-circular convolution of two vectors $u, v \in \mathbb{R}^{N_t}$ by summing the anti-diagonal entries their outer product $uv^T$. Consequently, the adjoint of $\mathcal{H}$ applied to a vector v repeats the entries of $$\frac{1}{N_t} v$$

along the anti-diagonal entries of an $N_t \times N_t$ matrix.

In light of conditions C1-C3, we express our sparse deconvolution as a nonconvex constrained optimization problem $$\min_{d,x} \frac{1}{2} \sum_j \|r_j - \mathcal{H}((A_j x) d^T)\|_2^2, \quad (8)$$

subject to $\|x\|_0 \leq \hat{p}$, $\|d\|_0 \leq q$, where j indexes transmitter-receiver pairs $(n_r, n_s) \in N_r \times N_s$, and $\hat{p}$ and q are predetermined bounds on the sparsities of x and d, respectively.

Figure 2:
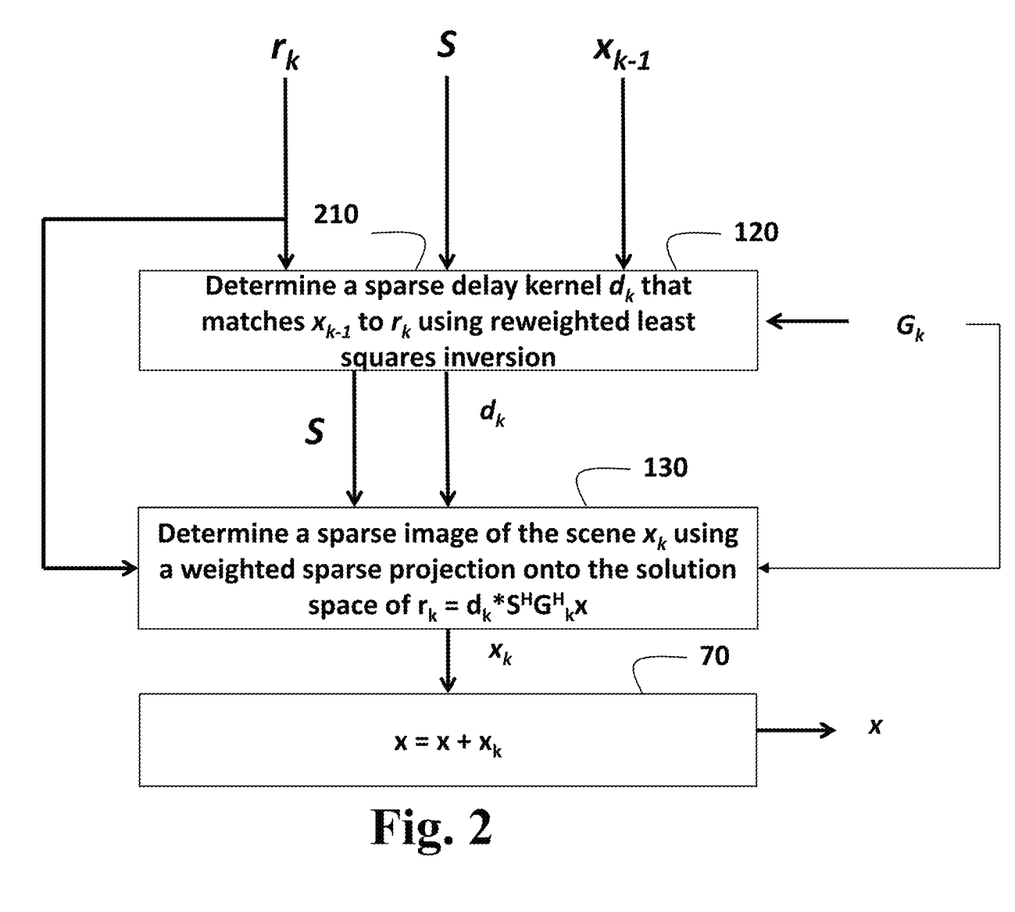
FIG. 2 is a detailed flow diagram of the sparse delay kernel determination and the sparse image determination steps.

FIG. 2 shows key steps for generating the image 70. As shown in FIG. 2, the sparse delay kernel $d_k$ is determined 120 from the echoes $r_k$, the source waveform matched-filtering operator S, and the previous image $x_{k-1}$. Then, the updated sparse image x 70 is determined 130 using a weighted sparse projection onto the solution space of $r_k = d_k * S^H G^H_k x$.

In the first stage, we fix $x = x_{j-1}$ and solve for $d_j$ that minimizes $$d_j = \operatorname*{argmin}_{d} \frac{1}{2} \|r_j - \mathcal{H}((A_j x_{j-1}) d^T)\|_2^2 \text{ s.t. } \|d\|_0 \leq q. \quad (9)$$

In a second stage, we fix $d = d_j$ and solve for $x_j$ that minimizes $$x_j = \operatorname*{argmin}_{x} \frac{1}{2} \|r_j - \mathcal{H}((A_j x) d_j^T)\|_2^2 \text{ s.t. } \|x\|_0 \leq p_j, \quad (10)$$

where the sparsity bound $p_j$ increases with j up to $\hat{p}$. The increasing sequence $p_j$ favors including only larger magnitude reflectors in the image x early in the estimation, which helps allocate the multipath and clutter matching to d.

Sparse Kaczmarz with Clutter Deconvolution

This algorithm uses a sparse initial estimate of the image $x_0 = \mathcal{T}_{hard}(A_1^H r_1; \tau)$ which we determine as a hard-thresholding of $A_1^H r_1$ using some large threshold $\tau$. For example, we set $\tau = 0.9 \|A_1 r_1\|_\infty$. Notice that the single step image update of SRK is now replaced with a gradient descent loop that deconvolves the estimate $d_j$ from the update for $x_j$. Similarly, the update loop of $d_j$ deconvolves $y_j$ from its update. Moreover, we employ an oblique projection step onto the subspace $A_j x_j = r_j$ weighted by the diagonal matrix W instead of the orthogonal projection onto $A_j W x_j = r_j$ used in SRK. Finally, we note that we also use diagonal weighting matrices to promote sparsity on the updates $d_j$ and $x_j$.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for generating an image of a scene behind a wall, wherein the scene is represented as a grid, comprising steps:
   transmitting a radar pulse through the wall using a transmitter;
   receiving, in a receiver at a known location, a set of echoes corresponding to the radar pulse being reflected by the scene;
   determining, based on the location, an imaging operator that relates the set of echoes to the grid;
   obtaining, using the imaging operator, a sparse delay kernel that matches a response of a current image to a similar response in the set of echoes;
   updating the current image, based on the set of echoes, the imaging operator, and the sparse delay kernel; and
   repeating the transmitting, the receiving, the determining, the obtaining, and the updating steps for different known locations until a termination condition is reached, and wherein the determining, the obtaining, and the updating steps are performed in a processor.

2. The method of claim 1, wherein the transmitter, receiver and processor are integrated in a mobile device.

3. The metod of of claim 2, wherein the current image is displayed on a screen of the device.

4. The method of claim 1, wherein the different locations are associated with the transmitter.

5. The method of claim 1, wherein the different locations are associated with the receiver.

6. The method of claim 1, wherein the grid is a three-dimensional volume of voxels.

7. The method of claim 1, wherein the response of the current image is another set of echoes, comprising:
   generating the set of echoes that are related to the current image using the imaging operator.

8. The method of claim 1, wherein the sparse delay kernel is determined using a deconvolution method.

9. The method of claim 1, wherein the current image is updated based on a weighted projection using a sparse Kaczmarz method, further comprising:
   determining a residual set of echoes by removing the response of the current image from the set of echoes;
   determining a set of locations for targets in the scene;
   projecting the residual set of echoes using the imaging operator weighted according to the set of locations of targets.

10. The method of claim 1, wherein the transmiter includes a set of one or more transmitting antennas, and the receiver includes a set of one or more receiving antenna.

11. The method of claim 1, wherein a spacing between the different locations is non-uniform.

12. The method of claim 1, wherein the termination condition condition is reached when a difference between the current image before and after the updating is less than a threshold.

13. The method of claim 1, wherein the transmitting and receiving are performed during an on-line phase, and the determining, the obtaining, and the updating steps are performed during an off-line phase.

14. The method of claim 13, further comprising:
   storing the different locations and the corresponding set of echoes in a memory during the on-line phase.

15. The method of claim 14. furhter comprising:
   transferring the locations and the corresponding set of echoes stored in the memory to the processor.

16. The method of claim 15, wherein the transferring is in batches.

17. The method of claim 16, wherein the batches are transferred in a random order with respect to the different locations.

18. A system for generating an image of a scene behind a wall, wherein the scene is represented as a grid, comprising:
   a transmitter configured to transmit a radar pulse through the wall;
   a receiver at a known location configured to receive a set of echoes corresponding to the radar pulse being reflected by the scene;

a processor connected to the transmitter and the receiver for determining an imaging operator that relates the set of echoes to the grid based on the location, obtaining a sparse delay kernel that matches a response of a current image to a similar response in the set of echoes using the imaging operator, updating the current image based on the set of echoes, the imaging operator, and the sparse delay kernel; and repeating the transmitting, the receiving, the determining, the obtaining, and the updating steps for different locations until a termination condition is reached.

* * * * *